(12) United States Patent
Horigome

(10) Patent No.: US 12,145,260 B2
(45) Date of Patent: Nov. 19, 2024

(54) ROBOT MAINTENANCE FIXTURE

(71) Applicant: FANUC CORPORATION, Yamanashi (JP)

(72) Inventor: Atsushi Horigome, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/248,111

(22) PCT Filed: Oct. 12, 2021

(86) PCT No.: PCT/JP2021/037641
§ 371 (c)(1),
(2) Date: Apr. 6, 2023

(87) PCT Pub. No.: WO2022/080337
PCT Pub. Date: Apr. 21, 2022

(65) Prior Publication Data
US 2023/0381982 A1 Nov. 30, 2023

(30) Foreign Application Priority Data

Oct. 13, 2020 (JP) .................................. 2020-172429

(51) Int. Cl.
*F16M 11/00* (2006.01)
*B25J 19/00* (2006.01)

(52) U.S. Cl.
CPC ................. *B25J 19/0066* (2013.01)

(58) Field of Classification Search
CPC ........................ B25J 19/0066; B25J 9/0018
See application file for complete search history.

(56) References Cited

U.S. PATENT DOCUMENTS

| | | | | |
|---|---|---|---|---|
| 5,415,057 A | * | 5/1995 | Nihei | B25J 19/0012 16/400 |
| 6,431,515 B1 | * | 8/2002 | Gampe | F16M 11/24 362/147 |
| 8,464,413 B1 | | 6/2013 | Prater et al. | |
| 10,876,679 B2 | * | 12/2020 | Monir | F16M 11/18 |
| 11,666,412 B2 | * | 6/2023 | Pichler | A61B 90/50 211/85.13 |

(Continued)

FOREIGN PATENT DOCUMENTS

| | | |
|---|---|---|
| JP | H05116091 A | 5/1993 |
| JP | H08323658 A | 12/1996 |

(Continued)

*Primary Examiner* — Amy J. Sterling
(74) *Attorney, Agent, or Firm* — Maier & Maier, PLLC

(57) ABSTRACT

A robot maintenance fixture includes: a fixture body removably attached to a robot mounted in a state of being suspended from a stand; a first hanger portion that can be disposed vertically above a position of the center of gravity of a working part of the robot, the working part being a part driven by an actuator on which maintenance is to be performed, the working part being in a state of being attached to the actuator, and with which the working part can be suspended from the fixture body with a first hanger member; and a second hanger portion that can be disposed vertically above a position of the center of gravity of the actuator in a state of being attached to the robot and with which the actuator can be suspended from the fixture body with a second hanger member.

6 Claims, 6 Drawing Sheets

(56) References Cited

U.S. PATENT DOCUMENTS

| | | | |
|---|---|---|---|
| 2011/0054682 A1* | 3/2011 | Miyauchi | B25J 9/0087 |
| | | | 700/245 |
| 2017/0232581 A1 | 8/2017 | Gouw et al. | |
| 2022/0080546 A1* | 3/2022 | Cambruzzi | B66B 19/002 |
| 2022/0185635 A1* | 6/2022 | Haarhoff | B66C 13/085 |

FOREIGN PATENT DOCUMENTS

| | | |
|---|---|---|
| JP | H0938885 A | 2/1997 |
| JP | 2013078815 A | 5/2013 |
| JP | 2015042579 A | 3/2015 |
| JP | 2020189386 A | 11/2020 |
| KR | 20120014650 A | 2/2012 |

\* cited by examiner

ROBOT MAINTENANCE FIXTURE

TECHNICAL FIELD

The present disclosure relates to a robot maintenance fixture.

BACKGROUND

A known maintenance tool lifts, by means of a chain block disposed above a robot installed on the floor, a motor removed in robot maintenance work (for example, see Japanese Unexamined Patent Application Publication No. Hei 5-116091).

SUMMARY

An aspect of the present disclosure is a robot maintenance fixture including: a fixture body removably attached to a robot installed in a state of being suspended from a stand; a first hanger portion that can be disposed vertically above a position of the center of gravity of a working part of the robot, the working part being a part driven by an actuator on which maintenance is to be performed, the working part being in a state of being attached to the actuator, and with which the working part can be suspended from the fixture body with a first hanger member; and a second hanger portion that can be disposed vertically above a position of the center of gravity of the actuator in a state of being attached to the robot and with which the actuator can be suspended from the fixture body with a second hanger member.

DETAILED DESCRIPTION OF EMBODIMENTS

A robot maintenance fixture 10 according to an embodiment of the present disclosure will be described below with reference to the drawings.

Figure 1:
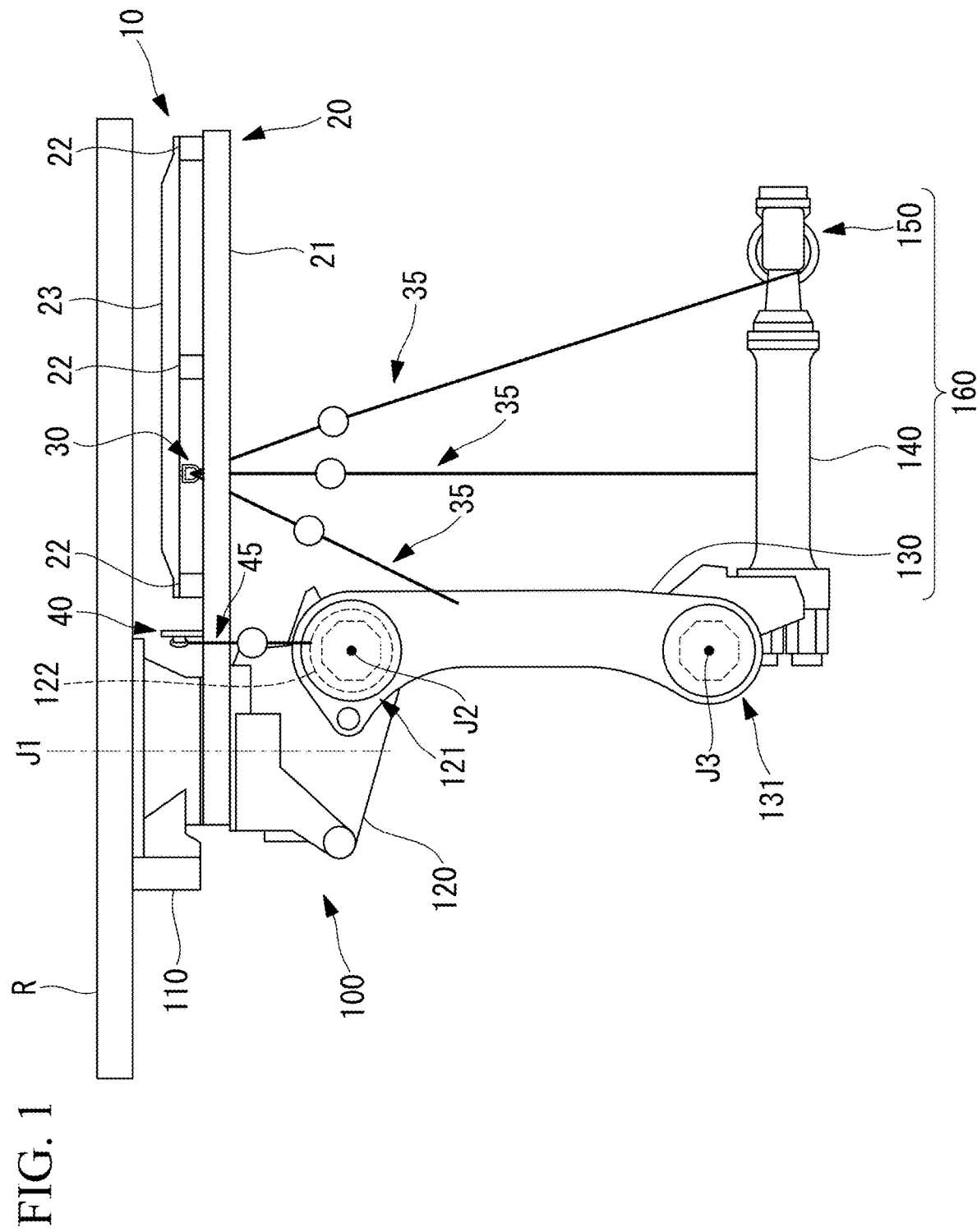
FIG. 1 is a side view schematically showing an example of a ceiling-mounted robot equipped with a robot maintenance fixture according to an embodiment of the present disclosure.

As shown in FIG. 1, the robot maintenance fixture 10 according to this embodiment is a maintenance fixture used in maintenance work for a ceiling-mounted robot 100 installed so as to be suspended from a stand R.

As shown in, for example, FIG. 1, the robot 100 includes a base 110 installed on the ceiling of the stand R from below and a swing drum 120 supported so as to be rotatable about a vertically extending first axis (axis) J1 with respect to the base 110. The robot 100 also includes a first arm 130 supported so as to be rotatable about a horizontally extending second axis J2 with respect to the swing drum 120 and a second arm 140 supported so as to be rotatable about a third axis J3, which is parallel to the second axis J2, with respect to the first arm 130. A three-axis wrist unit 150 is supported at the distal end of the second arm 140.

Figure 2:
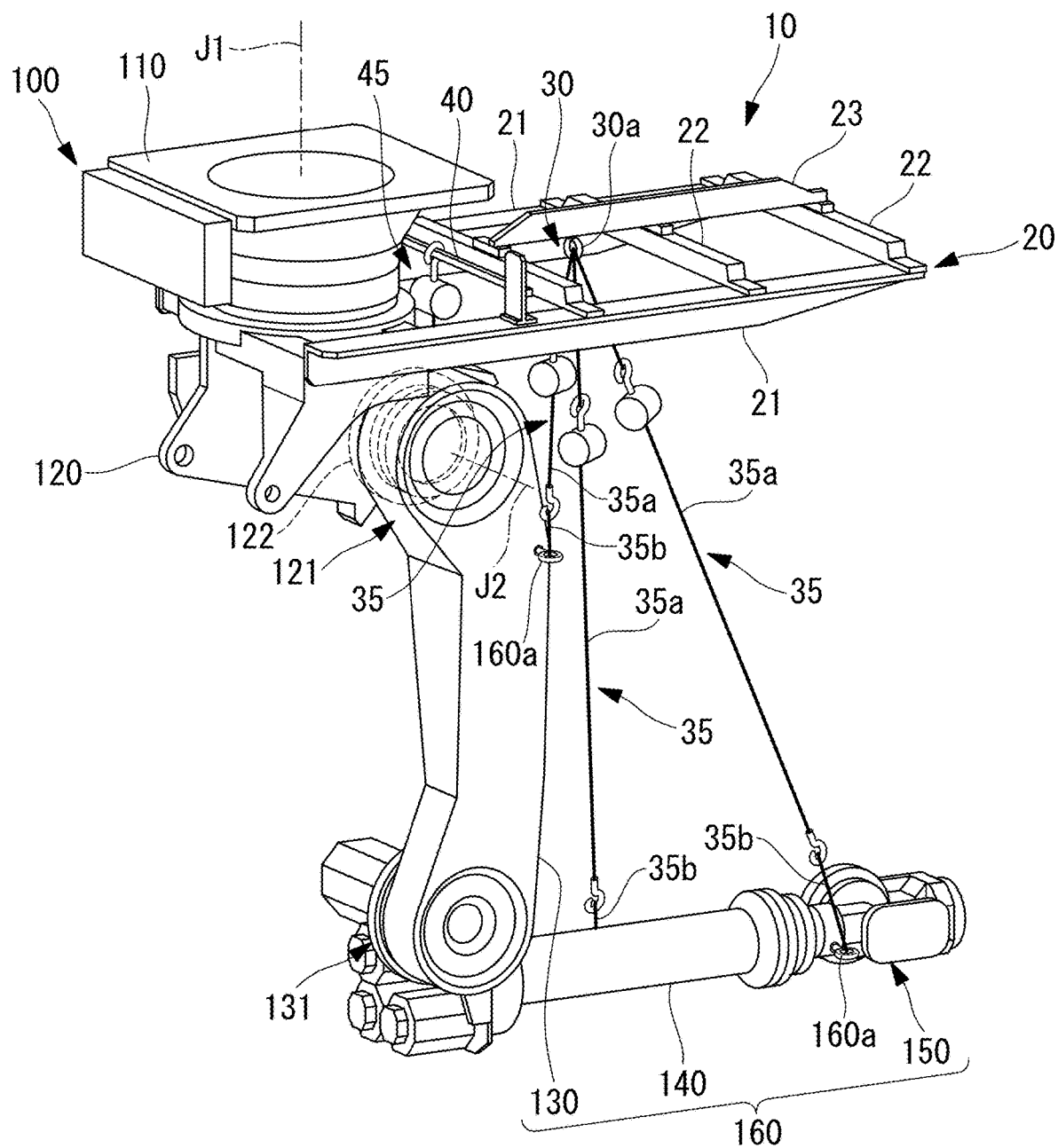
FIG. 2 is a perspective view showing the robot equipped with the robot maintenance fixture in FIG. 1.

As shown in FIGS. 1 and 2, the robot maintenance fixture according to this embodiment is used when maintenance, such as replacement etc., of an actuator 121 that drives the first arm 130 with respect to the swing drum 120, is performed. The robot maintenance fixture 10 is also used when maintenance, such as replacement etc., of an actuator 131 that drives the second arm 140 with respect to the first arm 130, is performed. Hereinbelow, a case where maintenance of the actuator 121 that drives the first arm 130 is performed will be described as an example.

The actuator 121 that drives the first arm 130 includes a reducer 122 disposed between the swing drum 120 and the first arm 130, and a motor (not shown) that is fixed to the swing drum 120 and that generates power to be input to the reducer 122. In the case of replacing this motor, when the motor is removed, the entire working part from the first arm 130 to the distal end (hereinbelow referred to as a working part 160) needs to be suspended to prevent the first arm 130 from rotating in the gravity direction as a result of disengagement of a brake provided on the motor. Furthermore, similarly to the above, in the case of replacing the reducer 122, the working part 160 needs to be suspended because the working part 160 needs to be removed from the reducer 122.

The robot maintenance fixture 10 includes a fixture body a first hanger portion 30, and a second hanger portion 40.

The fixture body 20 is, for example, a high-stiffness frame-like structure formed by assembling steel members and is fixed to the swing drum 120 by fastening bolts into robot-transporting screw holes provided in a side surface of the swing drum 120.

In the example shown in FIG. 2, the fixture body 20 includes a pair of parallel elongated members 21 that are fixed to the swing drum 120 to extend horizontally from the swing drum 120 toward the front side of the robot 100 in a cantilevered manner. The fixture body 20 also includes a plurality of connecting members 22 extending between the top surfaces of the pair of elongated members 21 in a state of being attached to the swing drum 120, and a support member 23 disposed in the middle of the pair of elongated members 21 so as to be parallel thereto and extending over the top surfaces of the connecting members 22.

The first hanger portion 30 is formed of a hanger fitting having a ring-like portion (attachment portion) 30a, such as an eyebolt, fixed by being fastened to a screw hole provided in the lower surface of the support member 23. As shown in FIG. 1, the first hanger portion 30 is disposed substantially vertically above the position of the center of gravity of the working part 160 when the working part 160, in a state of being attached to the reducer 122, is in a maintenance orientation. The maintenance orientation of the working part 160 is an orientation in which, for example, the first arm 130 extends vertically downward, and the second arm 140 extends in the horizontal direction.

The second hanger portion 40 is formed of a rod-like member extending parallel to the second axis J2 and is fixed so as to extend between the top surfaces of the pair of elongated members 21. The second hanger portion 40 is disposed substantially vertically above the position of the center of gravity of the reducer 122 in a state of being attached to the swing drum 120.

The operation of the thus-configured robot maintenance fixture 10 according to this embodiment will be described below.

When the reducer 122 of the ceiling-mounted robot 100 is to be replaced, first, as shown in FIG. 2, the fixture body 20 is attached to the swing drum 120 of the robot 100 in a state of being suspended from the stand R.

Next, the working part 160 is suspended from the first hanger portion 30 with first hanger members 35 attached to the ring-like portion 30*a* of the first hanger portion 30. In the example shown in FIG. 2, the first hanger members 35 include three sets each consisting of a chain block 35*a* and suspension belts 35*b*.

Of the suspension belts 35*b* disposed at both ends of the chain blocks 35*a*, those at one end are attached to the ring-like portion 30*a* of the first hanger portion 30, and those at the other end are wound around respective portions of the working part 160 or engaged with hanger fittings 160*a* attached to the working part 160. Then, the tension of the suspension belts 35*b* is adjusted by operating the chain blocks 35*a*. In this state, by removing the bolts with which the working part 160 is attached to the reducer 122, it is possible to separate the working part 160 from the reducer 122 and suspend the working part 160 from the first hanger portion 30.

In this case, because the first hanger portion 30 is disposed substantially vertically above the position of the center of gravity of the working part 160 in a state of being attached to the reducer 122, the working part 160 in a state of being separated from the reducer 122 is suspended vertically above the position of the center of gravity thereof. With this configuration, it is possible to prevent the working part 160 from abruptly moving at the moment of being separated from the reducer 122 and, thus, to maintain a stably suspended state.

Figure 3:
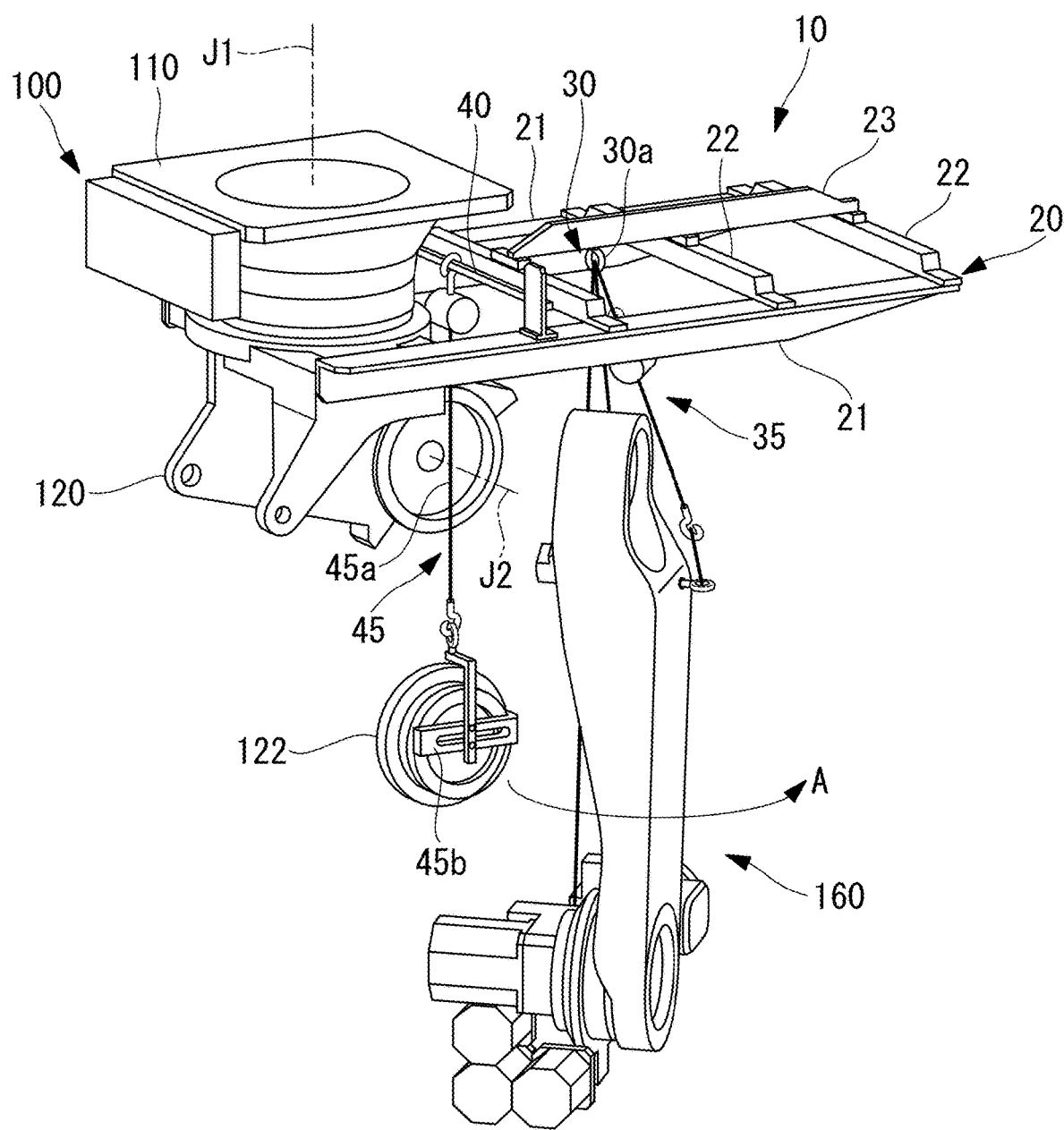
FIG. 3 is a perspective view showing a state in which a working part and a reducer are suspended with the robot maintenance fixture in FIG. 1.

Next, as shown in FIG. 3, the working part 160 suspended from the first hanger portion 30 is rotated about a vertical line, as shown by arrow A, to change the orientation thereof. Because the position of the center of gravity of the working part 160 is located closer to the front side than the second axis J2 is, by rotating the working part 160 about the vertical line passing through the position of the center of gravity, it is possible to move the working part 160, which has been separated from the reducer 122, in a direction away from the reducer 122.

Thus, it is possible to ensure a large work space when the reducer 122 is removed from the robot 100, improving the operation efficiency.

Next, the reducer 122 exposed by moving the working part 160 is suspended with a second hanger member 45 attached to the second hanger portion 40. The second hanger member 45 includes a chain block 45*a* and a fixture 45*b* fixed to the reducer 122. By operating the chain block 45*a* in a state in which one hook of the chain block 45*a* is engaged with the second hanger portion 40 and the other hook is engaged with the fixture 45*b*, the tension of the wire of the chain block is adjusted. In this state, by removing the bolts with which the reducer 122 is fixed to the swing drum 120, it is possible to suspend the reducer 122, which has been removed from the swing drum 120, with the second hanger member 45.

In this case, because the second hanger portion 40 is disposed substantially vertically above the position of the center of gravity of the reducer 122 in a state of being attached to the swing drum 120, it is possible to maintain the reducer 122 in a stably suspended state even when the reducer 122 is separated from the swing drum 120.

Furthermore, by moving the second hanger member 45 along the second hanger portion 40, which is made of a rod-like member, it is possible to move the suspended reducer 122 in a direction away from the swing drum 120. As a result, in a state in which the reducer 122 has been moved to a position where it does not touch the swing drum 120 or the like, it is possible to lower the reducer 122 to the floor by operating the chain block 45*a*. Then, the second hanger member 45 is attached to a repaired reducer 122 or a new reducer 122, that reducer 122 is lifted to the position of the second axis J2 by operating the chain block 45*a* again and is attached to the swing drum 120, and the working part 160 is attached to the reducer 122. This way, the replacement work of the reducer 122 is completed.

According to this embodiment, because the reducer 122 and the working part 160 are suspended from the fixture body 20 fixed to the swing drum 120, it is possible to perform the replacement work of the reducer 122 without being inhibited by the stand R to which the robot 100 is mounted. Specifically, it is possible to perform maintenance on the reducer 122 of the robot 100 suspended from the ceiling without using a ceiling crane.

Furthermore, by fixing the fixture body 20 to the swing drum 120, it is possible to move the fixture body 20 in association with the swing drum 120. Hence, it is possible to dispose the first hanger portion 30 vertically above the position of the center of gravity of the working part 160 and to dispose the second hanger portion 40 vertically above the position of the center of gravity of the reducer 122, regardless of the angle of the swing drum 120 with respect to the base 110.

Note that, in this embodiment, the first hanger portion is formed of the hanger fitting, which is fixed to the support member 23 of the fixture body 20 and which has the ring-like portion 30*a*. Instead, it is possible to configure the ring-like portion 30*a* so as to be rotatable about a vertical line with respect to the fixture body 20.

As a result, as shown in FIG. 3, it is possible to easily rotate the working part 160, in a state of being separated from the reducer 122 and suspended from the first hanger portion 30 with the first hanger members 35, about a vertical line to change the orientation thereof. Specifically, it is possible to easily separate the working part 160 from the reducer 122, it is possible to ensure a large work space when the reducer 122 is removed from the robot 100, and thus it is possible to improve the efficiency of the maintenance work on the reducer 122.

Furthermore, there may be a plurality of screw holes, to which a hanger fitting constituting the first hanger portion can be attached, provided at intervals in the longitudinal direction of the support member 23. In that case, because the position of the center of gravity of the working part 160 changes depending on the weight of the tool or the like attached to the distal end of the wrist unit 150, the hanger fitting is fixed to a screw hole located closest to the position vertically above the position of the center of gravity of the working part 160.

Figure 4:
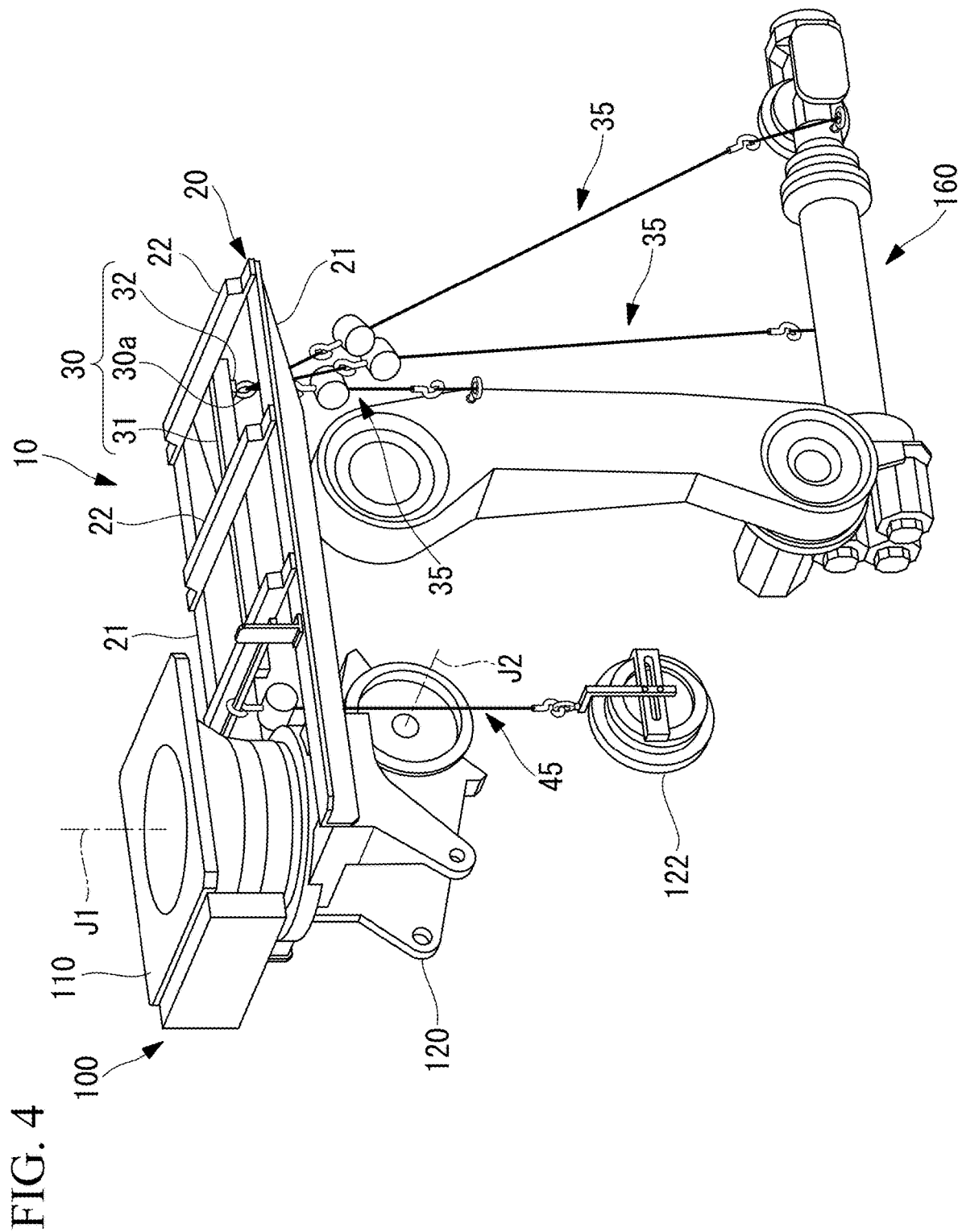
FIG. 4 is a perspective view showing a state in which the working part and the reducer are suspended with a first modification of the robot maintenance fixture in FIG. 1.

Furthermore, as shown in FIG. 4, the first hanger portion may include a rail 31 fixed to the lower surfaces of the connecting members 22 so as to be parallel to the elongated members 21, and a slider 32 supported so as to be movable in the horizontal direction along the rail 31, and the hanger fitting may be fixed to the slider 32.

This configuration makes it possible to dispose the hanger fitting at a position closest to the position vertically above the position of the center of gravity of the working part 160 by adjusting the position of the slider 32 and makes it possible to easily move the suspended working part 160 away from the reducer 122 in the horizontal direction.

Furthermore, regarding the direction of the rail 31, although the rail 31 is desirably disposed in the middle of the pair of elongated members 21 in order to adjust the position of the center of gravity, it may be disposed in an arbitrary horizontal direction in order to move the working part 160.

Furthermore, although the case where the second hanger portion 40 extends parallel to the second axis J2 has been described as an example, instead, the second hanger portion 40 may extend in an arbitrary horizontal direction.

Figure 5:
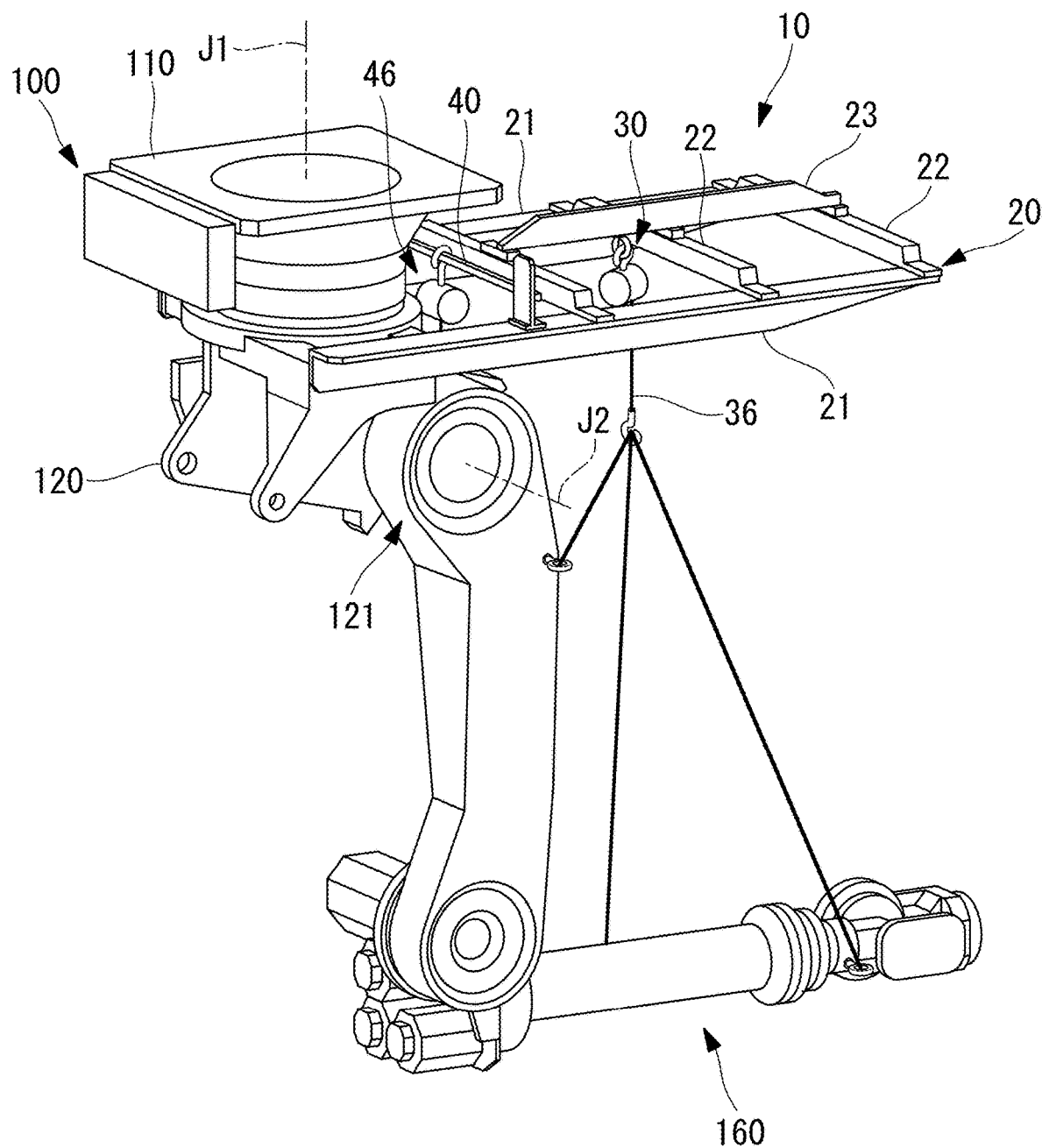
FIG. 5 is a perspective view showing a robot equipped with a second modification of the robot maintenance fixture in FIG. 1.

Furthermore, in this embodiment, the first hanger members to be attached to the first hanger portion 30 have the chain blocks 35a for adjusting the height position of the suspended working part 160. Instead, as shown in FIG. 5, the first hanger portion 30 may include a first height-adjustment mechanism 36, such as a chain block.

Similarly, the second hanger portion 40 may include a second height-adjustment mechanism 46, such as a chain block, for adjusting the height position of the suspended reducer 122.

Figure 6:
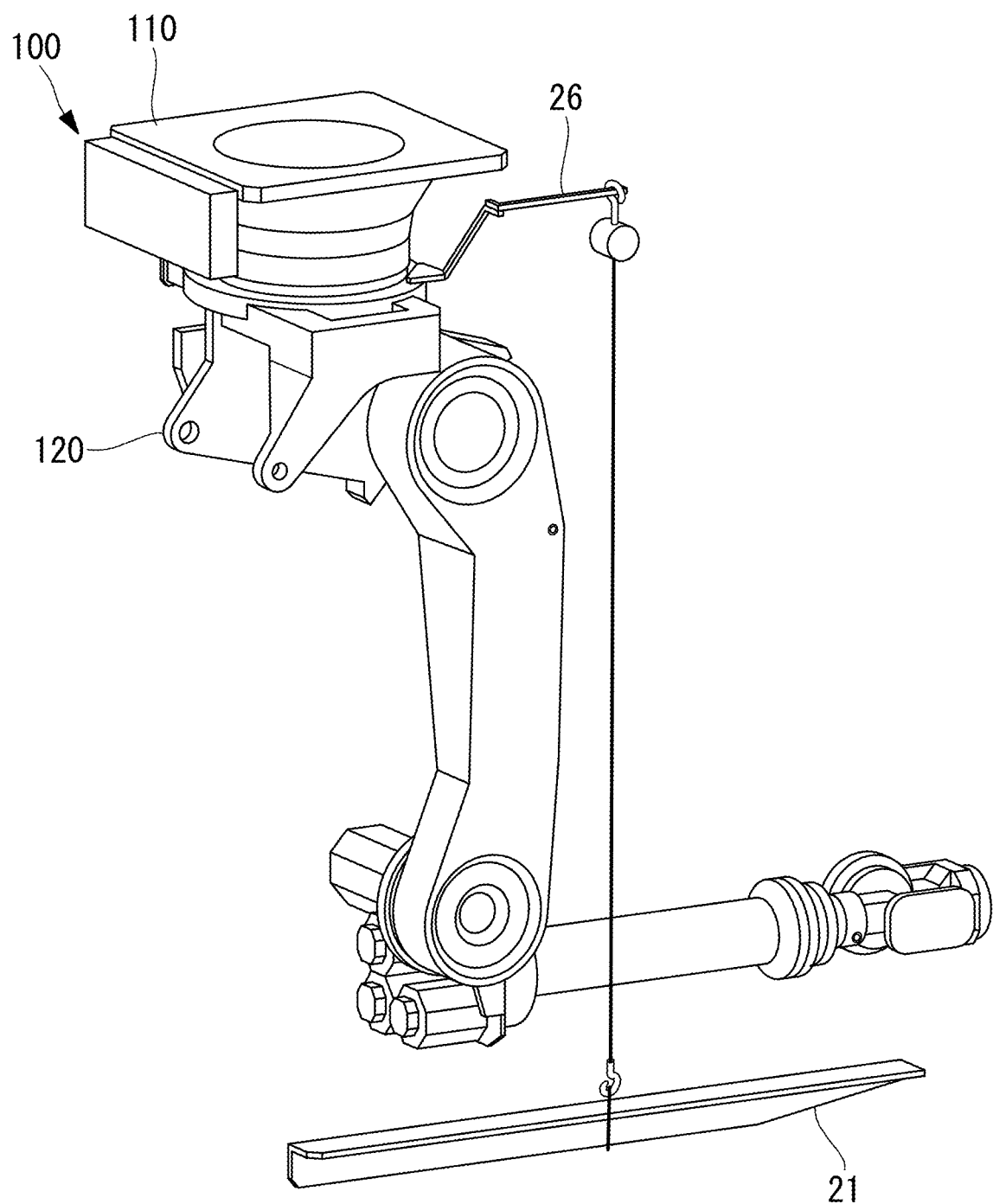
FIG. 6 is a perspective view showing an example of a method of attaching the robot maintenance fixture in FIG. 1 to the robot.

Furthermore, in this embodiment, as shown in FIG. 6, in the robot maintenance fixture 10, a fixture lifting fixture 26, to which a chain block for lifting the fixture body 20 to the position of the swing drum 120 is fixed, may be fixed to the swing drum 120 or the base 110. The fixture body 20 may be lifted as a single body, or, because the fixture body 20 is a heavy object, the elongated members 21, the connecting members 22, and the support member 23 may be separately lifted and assembled while being fixed to the swing drum 120.

Furthermore, although the fixture body 20 is fixed to the swing drum 120 in this embodiment, instead, the fixture body may be fixed to the base 110 when it is possible to dispose the swing drum 120 at a specific maintenance position with respect to the base 110 during the maintenance. By attaching the fixture body 20 to the base 110, it is possible to increase the work space above the working part 160, compared with a case where the fixture body 20 is attached to the swing drum 120.

Furthermore, although the case where the reducer 122 is to be replaced has been described in this embodiment, instead, the present disclosure may be applied to a case where the motor is to be replaced. When the motor is to be replaced, the working part 160 is suspended from the first hanger portion 30 with the first hanger members 35 without separating the working part 160 from the reducer 122, and the motor is removed from the swing drum 120 in a state in which the motor is suspended from the second hanger portion 40 with the second hanger member 45.

The invention claimed is:

1. A robot maintenance fixture for maintaining a robot that includes a swing drum supported in a state of being suspended from a stand, an actuator configured to be removable from the swing drum, and a working part driven by the actuator and configured to be removable from the actuator, the robot maintenance fixture comprising:
   a fixture body removably attached to the swing drum;
   a first hanger portion and a second hanger portion each of which is configured to be supported by the fixture body;
   a first hanger member that is attached to the first hanger portion and that extends toward the working part so as to be configured to suspend the working part; and
   a second hanger member that is attached to the second hanger portion and that extends toward the actuator so as to be configured to suspend the actuator, wherein
   the first hanger portion is disposed vertically above a position of the center of gravity of the working part attached to the actuator, and
   the second hanger portion is disposed vertically above a position of the center of gravity of the actuator attached to the swing drum.

2. The robot maintenance fixture according to claim 1, wherein the first hanger portion is supported by the fixture body so as to be rotatable about a vertical line.

3. The robot maintenance fixture according to claim 1, wherein the first hanger portion is supported by the fixture body so as to be movable in the horizontal direction.

4. The robot maintenance fixture according to claim 1, wherein, in the second hanger portion is supported by the fixture body so as to be movable in the horizontal direction.

5. The robot maintenance fixture according to claim 1, further comprising a first height-adjustment mechanism configured to adjust a height position of the suspended working part.

6. The robot maintenance fixture according to claim 1, further comprising a second height-adjustment mechanism configured to adjust a height position of the suspended actuator.

* * * * *